United States Patent
Lavee et al.

(10) Patent No.: US 10,320,913 B2
(45) Date of Patent: Jun. 11, 2019

(54) SERVICE CONTENT TAILORED TO OUT OF ROUTINE EVENTS

(71) Applicant: MICROSOFT TECHNOLOGY LICENSING, LLC, Redmond, WA (US)

(72) Inventors: Gal Lavee, Herzliya (IL); Dikla Dotan-Cohen, Herzliya (IL); Oded Vainas, Herzliya (IL); Hadas Bitran, Ramat HaSharon (IL); Limor Lahiani, Herzliya (IL); Ido Priness, Herzliya (IL); Haim Somech, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 612 days.

(21) Appl. No.: 14/562,352

(22) Filed: Dec. 5, 2014

(65) Prior Publication Data
US 2016/0164974 A1    Jun. 9, 2016

(51) Int. Cl.
*G06F 17/30*    (2006.01)
*G06F 7/00*    (2006.01)
(Continued)

(52) U.S. Cl.
CPC ........ *H04L 67/125* (2013.01); *G06F 16/9535* (2019.01); *G06Q 10/06* (2013.01); *G06Q 30/0251* (2013.01); *H04L 67/22* (2013.01)

(58) Field of Classification Search
CPC . H04L 67/125; H04L 67/22; G06F 17/30867; G06Q 10/06; G06Q 30/0251
(Continued)

(56) References Cited

U.S. PATENT DOCUMENTS 6,606,615 B1 *   8/2003   Jennings ................ G06Q 10/06
                                                                706/45ke
6,651,044 B1 *  11/2003   Stoneman .............. G06N 20/00
                                                                706/10
(Continued)

FOREIGN PATENT DOCUMENTS

EP    2284574 A2    2/2011
EP    2420964 A2    2/2012
(Continued)

OTHER PUBLICATIONS

Missed Call Text Reminder, Retrieved on: Feb. 10, 2015, Available at: https://play.google.com/store/apps/details?id=com.hidtechs.alertme&hl=en.
(Continued)

*Primary Examiner* — Pavan Mamillapalli
(74) *Attorney, Agent, or Firm* — Shook, Hardy & Bacon L.L.P.

(57) ABSTRACT

In implementations, a divergence from a pattern of detected instances of an event is identified, where the event is of a routine of a user. The identified divergence corresponds to an out of routine event. Contextual information is generated corresponding to the identified out of routine event. Furthermore, one or more recommended actions for presenting content to the user are selected based on the contextual information. An indication of the identified out of routine event, the contextual information, and the one or more recommended actions are provided to a service, which may be an application on a user device. The service can present content to the user based on the identified out of routine event, the generated contextual information corresponding to the identified out of routine event, and the selected one or more recommended actions. The service may follow or disregard any of the selected one or more recommended actions.

20 Claims, 7 Drawing Sheets

(51) Int. Cl.
  *H04L 29/08* (2006.01)
  *G06F 16/9535* (2019.01)
  *G06Q 10/06* (2012.01)
  *G06Q 30/02* (2012.01)

(58) Field of Classification Search
  USPC ...................................................... 707/722
  See application file for complete search history.

(56) References Cited

U.S. PATENT DOCUMENTS

| | | |
|---|---|---|
| 6,989,753 B1 | 1/2006 | Lamming et al. |
| 7,366,548 B2 | 4/2008 | Del Signore |
| 7,620,697 B1* | 11/2009 | Davies .................... H04L 43/00 709/217 |
| 7,856,360 B2 | 12/2010 | Kramer et al. |
| 7,895,277 B2 | 2/2011 | Drory et al. |
| 7,996,338 B2 | 8/2011 | Kamar et al. |
| 8,140,561 B2* | 3/2012 | Fukazawa .......... G06Q 10/0631 707/767 |
| 8,275,649 B2 | 9/2012 | Zheng et al. |
| 8,335,494 B2 | 12/2012 | Wilkerson |
| 8,352,561 B1 | 1/2013 | Denise |
| 8,457,608 B2 | 6/2013 | Wilkerson |
| 8,483,665 B2 | 7/2013 | Kissinger et al. |
| 8,520,814 B2 | 8/2013 | Jiang et al. |
| 8,558,703 B2 | 10/2013 | Edlund et al. |
| 8,565,731 B2 | 10/2013 | Lynch |
| 8,594,641 B2 | 11/2013 | Neilsen |
| 8,661,087 B2 | 2/2014 | Denise |
| 8,676,167 B2 | 3/2014 | Ferro |
| 8,719,198 B2 | 5/2014 | Zheng et al. |
| 8,775,351 B2 | 7/2014 | Moore et al. |
| 8,798,249 B2 | 8/2014 | Kalpathy Narayanan |
| 8,862,676 B1 | 10/2014 | Bilinski et al. |
| 8,866,607 B2 | 10/2014 | Velusamy |
| 9,274,687 B1 | 3/2016 | Meschkat |
| 9,749,808 B2* | 8/2017 | Tuukkanen ............ G01C 21/26 |
| 9,750,433 B2* | 9/2017 | Hu ......................... A61B 5/002 |
| 9,858,790 B1* | 1/2018 | Goyal ................ G08B 21/0423 |
| 2001/0029194 A1 | 10/2001 | Ketola et al. |
| 2002/0091692 A1* | 7/2002 | Yoshida .................. G06Q 30/02 |
| 2003/0058842 A1* | 3/2003 | Bud ........................ H04L 29/06 370/352 |
| 2003/0130899 A1* | 7/2003 | Ferguson ............... G06Q 30/06 705/26.1 |
| 2003/0140088 A1* | 7/2003 | Robinson ............... G06Q 10/10 709/202 |
| 2003/0212646 A1 | 11/2003 | Horvitz |
| 2004/0054572 A1* | 3/2004 | Oldale .................. G06F 16/337 706/1 |
| 2004/0128066 A1* | 7/2004 | Kudo .................. G01C 21/3617 701/468 |
| 2004/0194110 A1 | 9/2004 | McKee et al. |
| 2005/0164725 A1* | 7/2005 | Naito ................ G06F 16/24575 455/517 |
| 2006/0082472 A1* | 4/2006 | Adachi ............ G08G 1/096716 340/995.13 |
| 2006/0240803 A1 | 10/2006 | Valeriano et al. |
| 2007/0060114 A1* | 3/2007 | Ramer ................ G06F 16/9535 455/418 |
| 2007/0071209 A1 | 3/2007 | Horvitz et al. |
| 2007/0208498 A1* | 9/2007 | Barker .................. G08G 1/0104 701/117 |
| 2007/0214228 A1 | 9/2007 | Horvitz et al. |
| 2008/0004926 A1* | 1/2008 | Horvitz ................ G06Q 10/047 705/7.26 |
| 2009/0005987 A1 | 1/2009 | Vengroff |
| 2009/0187467 A1* | 7/2009 | Fang ................ G06F 17/30699 705/7.29 |
| 2009/0245483 A1 | 10/2009 | Shibuya et al. |
| 2009/0305744 A1 | 12/2009 | Ullrich |
| 2010/0331146 A1* | 12/2010 | Kil ..................... G06F 19/3481 482/8 |
| 2011/0076989 A1 | 3/2011 | Lynch |
| 2011/0099047 A1 | 4/2011 | Weiss et al. |
| 2011/0218992 A1 | 9/2011 | Waldman et al. |
| 2011/0239158 A1 | 9/2011 | Barraclough et al. |
| 2011/0270712 A1 | 11/2011 | Wood et al. |
| 2011/0285583 A1* | 11/2011 | Huang .................... G01S 19/40 342/357.23 |
| 2012/0030227 A1* | 2/2012 | Mital ...................... G06F 17/27 707/767 |
| 2012/0176236 A1 | 7/2012 | Kao et al. |
| 2012/0259705 A1* | 10/2012 | Monteverde ....... G06Q 30/0251 705/14.58 |
| 2013/0078958 A1 | 3/2013 | Kyprianou |
| 2013/0165185 A1 | 6/2013 | Guo et al. |
| 2013/0316313 A1 | 11/2013 | Darrow |
| 2013/0324093 A1 | 12/2013 | Santamaria et al. |
| 2013/0325855 A1 | 12/2013 | Kapicioglu et al. |
| 2014/0032325 A1 | 1/2014 | Weiss et al. |
| 2014/0032572 A1 | 1/2014 | Eustice et al. |
| 2014/0067455 A1 | 3/2014 | Zhang et al. |
| 2014/0082094 A1 | 3/2014 | Bilgen et al. |
| 2014/0095281 A1 | 4/2014 | Weiss et al. |
| 2014/0099614 A1* | 4/2014 | Hu ......................... G09B 19/00 434/236 |
| 2014/0114896 A1* | 4/2014 | Hawkins ................ G06N 3/049 706/46 |
| 2014/0120961 A1 | 5/2014 | Buck |
| 2014/0280657 A1 | 9/2014 | Miller et al. |
| 2014/0295807 A1 | 10/2014 | Li et al. |
| 2015/0118667 A1 | 4/2015 | Andrew et al. |
| 2015/0271645 A1 | 9/2015 | Wyatt et al. |
| 2015/0276419 A1* | 10/2015 | Hashem ................ G01C 21/20 701/425 |
| 2016/0091871 A1 | 3/2016 | Marti et al. |
| 2016/0091872 A1* | 3/2016 | Marti .................... H04L 12/282 700/275 |
| 2016/0232327 A1 | 8/2016 | Windridge et al. |
| 2016/0247175 A1* | 8/2016 | Milton .................. H04W 4/029 |
| 2016/0295372 A1 | 10/2016 | Kapicioglu et al. |

FOREIGN PATENT DOCUMENTS

| | | |
|---|---|---|
| WO | 2011067675 A2 | 6/2011 |
| WO | 2012146831 A1 | 11/2012 |
| WO | 2014128021 A1 | 8/2014 |

OTHER PUBLICATIONS

Kazmucha, Allyson, "How to use Remind me Later to handle inopportune calls on your iPhone", Published on:Nov. 7, 2012, Available at: http://www.imore.com/how-remind-yourself-return-missed-call-your-iphone.

Dey, et al., "CybreMinder: A Context-Aware System for Supporting Reminders", In Proceedings of the 2nd International Symposium on Handheld and Ubiquitous computing, Sep. 25, 2000, 15 pages.

International Search Report and Written Opinion Issued in PCT Application No. PCT/US2015/063843, dated Mar. 17, 2016, 13 Pages.

Ex Parte Quayle Action dated Apr. 6, 2016 in U.S. Appl. No. 14/626,458, 12 pages.

"Second Written Opinion Issued in PCT Application No. PCT/US2015/063843", dated Jun. 13, 2016, 7 Pages.

International Search Report with Written Opinion dated May 4, 2016 in PCT Application No. PCT/US2016/016249, 12 pages.

International Search Report and Written Opinion Issued in PCT Application No. PCT/US2016/016247, dated May 4, 2016, 10 Pages.

Notice of Allowance dated Sep. 14, 2016 in U.S. Appl. No. 14/626,458, 14 pages.

Second Written Opinion Issued in PCT Application No. PCT/US2016/016247, dated Oct. 11, 2016, 6 Pages.

"International Preliminary Report on Patentability Issued in PCT Application No. PCT/US2015/063843", dated Sep. 16, 2016, 8 Pages.

(56) References Cited

OTHER PUBLICATIONS

"International Preliminary Report on Patentability Issued in PCT Application No. PCT/US2016/016249", dated Jan. 11, 2017, 10 Pages.

"Second Written Opinion Issued in PCT Application No. PCT/US2016/016249", dated Oct. 11, 2016, 9 Pages.

Pianese, et al., "Discovering and Predicting User Routines by Differential Analysis of Social Network Traces", In IEEE 14th International Symposium and Workshops on a World of Wireless, Mobile and Multimedia Networks, Jun. 4, 2013, 10 pages.

"Routinely", Published on: Apr. 9, 2013 Available at: https://play.google.com/store/apps/details?id=com.braavos.apps.routinely&hl=en.

Knapen, et al., "Framework to Evaluate Rescheduling due to Unexpected Events in an Activity-Based Model", In TRB Annual Meeting, Nov. 14, 2012, 21 pages.

Carolis, et al., "Towards Learning Relations between User Daily Routines and Mood", In the 22nd Conference on User Modeling, Adaptation, and Personalization, Jul. 7, 2014, 8 pages.

Farrahi, et al., "What Did You Do Today? Discovering Daily Routines from Large-Scale Mobile Data", In Proceedings of the 16th ACM international conference on Multimedia, Oct. 26, 2008, 4 pages.

"ATracker—Daily Task and Time Tracking Lite", Published on: Apr. 3, 2014, 2 pages. Available at: https://itunes.apple.com/us/app/atracker-daily-task-time-tracking/id522008611?mt=8.

"International Search Report and Written Opinion Issued in PCT Application No. PCT/US2016/026484", dated Jun. 27, 2016, 10 Pages.

"Second Written Opinion Issued in PCT Application No. PCT/US2016/026484", dated Mar. 21, 2017, 7 Pages.

Non-Final Office Action dated Mar. 27, 2017 in U.S. Appl. No. 14/626,477, 21 pages.

Final Office Action dated Aug. 25, 2017 in U.S. Appl. No. 14/626,477, 25 pages.

Non-Final Office Action dated Sep. 13, 2017 in U.S. Appl. No. 14/680,762, 39 pages.

Non-Final Office Action dated Jan. 3, 2018 in U.S. Appl. No. 15/397,493, 9 pages.

Final Office Action dated Jan. 29, 2018 in U.S. Appl. No. 14/680,762, 45 pages.

Non-Final Office Action dated Feb. 2, 2018 in U.S. Appl. No. 14/626,477, 26 pages.

Notice of Allowance dated May 9, 2018 in U.S. Appl. No. 15/397,493, 7 pages.

"Office Action Issued in European Patent Application No. 15821187.0", dated Jan. 28, 2019, 9 Pages.

* cited by examiner

SERVICE CONTENT TAILORED TO OUT OF ROUTINE EVENTS

BACKGROUND

It has been said that humans are creatures of habit. Accordingly, many devices are designed to be adaptable or customizable to accommodate habitual behavior, or routines, of users. For example, many cellular telephones and home telephones permit a user to program speed dial numbers into them, allowing the user to dial the speed dial numbers by pressing only one key or button, rather than having to dial the entire telephone number. Likewise, many computer programs allow the user to customize graphical user interfaces (GUIs) in order to make tools or features that are commonly used more readily accessible. While these devices are most useful when a user engages in their habitual behavior, their utility is compromised when the user departs from their routine. For example, a user may become accustomed to features that assist or are otherwise tailored to their habitual behavior but are unavailable when acting out of routine. However, oftentimes, assistance would be most helpful when a user has diverged from, is diverging from, or plans to diverge from their routines.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of the present disclosure relate to service content tailored to out of routine events. An event can correspond to a defined user action or grouping of user actions, which may be under defined conditions, such as a time of day, a day of the week, a location, or other patterns or other detectable behavior associated with a user, such as actions associated with geographic locations, semantics of locations, persons with whom the user is with, weather conditions, and more. A user routine, or a routine of a user, can correspond to recurring actions, behavior patterns, or other habitual behavior of a user, such as workout habits of the user, the user's routine of commuting to work, and many more. In this respect, a routine may be defined in terms of one or more events that make up the routine.

In certain respects, the present disclosure provides for the detection and tracking of one or more instances of events with respect to users. The detected events can be analyzed with respect to one or more routines. For example, a routine may be identified as corresponding to a user based on patterns formed by detected events, corresponding to the user, that make up the routine.

In further respects, the present disclosure relates to identifying divergence between users and one or more routines of the users. A divergence between a user and a routine of the user may be identified by determining that one or more events that make up the routine are out of routine events. In some cases, an event may be out of routine for a routine where it is determined that a user will diverge from, or has diverged from, the event with respect to the routine. In this regard, a divergence can correspond to a departure from a modeled pattern of detected events for the event of the routine.

By identifying out of routine events, content, such as service content, can be provided to the users based on the identified out of routine events, so as to tailor the content to the out of routine events. Thus, for example, users may receive assistance or otherwise receive tailored content, even where it is identified that the users will diverge from, are diverging from, or have diverged from their routines. In some respects, content can be provided to a user based on identifying one or more out of routine events, and further based on contextual information that corresponds to out of routine events. Contextual information can be generated for one or more out of routine events, which can indicate context to the out of routine event (e.g., attributes of the out of routine event). Furthermore, one or more recommended actions for providing the content to the user may be determined. These and other concepts are contemplated as being within the scope of the present disclosure.

BRIEF DESCRIPTION OF THE DRAWINGS

The present invention is described in detail below with reference to the attached drawing figures, wherein.

DETAILED DESCRIPTION

Figure 1:
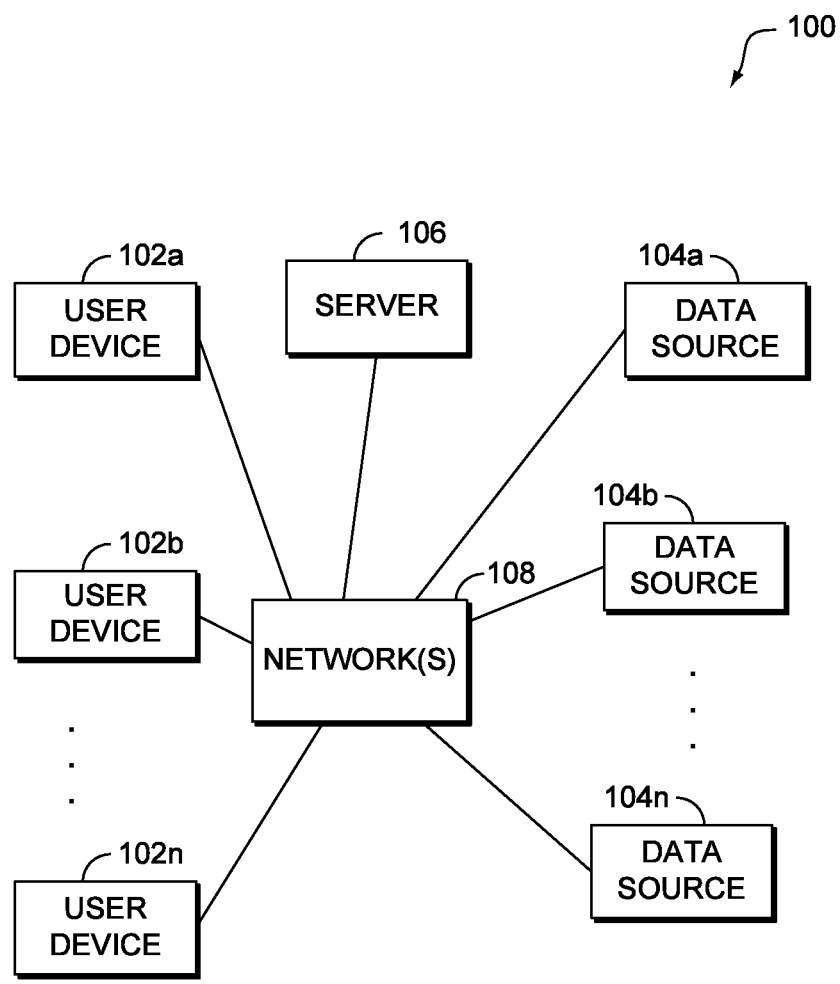
FIG. 1 is a block diagram showing a system for tailoring content to out of routine events in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to service content tailored to out of routine events. An event can correspond to a defined user action or grouping of user actions, which may be under defined conditions, such as a time of day, a day of the week, a location, or other patterns or other detectable behavior associated with a user, such as actions associated with geographic locations, semantics of locations, persons with whom the user is with, weather conditions, and more. A user routine, or a routine of a user, can correspond to recurring actions, or behavior patterns, of a user. In this respect, a routine may be defined in terms of one or more events that make up the routine.

In certain respects, the present disclosure provides for the detection and tracking of one or more instances of events with respect to users. The detected events can be analyzed with respect to one or more routines. For example, a routine may be identified as corresponding to a user based on patterns formed by detected events, corresponding to the user, that make up the routine.

In further respects, the present disclosure relates to identifying divergence between users and one or more routines of the users. A divergence between a user and a routine of the user may be identified by determining that one or more events that make up the routine are out of routine events. In some cases, an event may be out of routine for a routine where it is determined that a user will diverge from, has diverged from, or may diverge from the event with respect to the routine. In this regard, a divergence can correspond to a departure from a modeled pattern of detected events for the event of the routine.

By identifying out of routine events, content, such as service content, can be provided to the users based on the identified out of routine events, so as to tailor the content to the out of routine events. Thus, users may receive assistance, even where it is identified that the users will diverge from, are diverging from, or have diverged from their routines. In some respects, content can be provided to a user based on identifying one or more out of routine events, and further based on contextual information that corresponds to out of routine events. Contextual information can be generated for one or more out of routine events, which can indicate context to the out of routine event. Furthermore, the content may be provided based on one or more recommended actions for providing the content to the user.

In certain respects, routines may be analyzed based on accumulated user data that can indicate the occurrence of one or more instances of events of the routines. Accumulated user data can comprise a collection of data that corresponds to a user. The user data may be continuously collected over time by a large variety of possible data sources and/or data systems that on aggregate forms a detailed record of patterns of user actions, that correspond to one or more routines of the user. These routines of the user can be identified, extracted, and/or analyzed from the accumulated user data at a level of scope, accuracy, and quantity that otherwise would not be achievable by the user alone.

It is intended that the accumulation of user data embody robust privacy and data protection for individuals, businesses, and public-sector organizations. In this respect, users are given control over many aspects related to the user data, including the ability to opt in or opt out of data collection and/or any of the various tracking or analysis features described herein. Furthermore, safeguards are to be implemented to protect sensitive user data from access by other parties, including other users, without express consent of the user. Additionally, any user data is intended to be made anonymous, when possible.

Turning to FIG. 1, a diagram is provided illustrating an exemplary system 100 in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes a number of user devices, such as user devices 102a and 102b through 102n; a number of data sources, such as data sources 104a and 104b through 104n; server 106; and network 108. It should be understood that system 100 shown in FIG. 1 is an example of one suitable computing system architecture. Each of the components shown in FIG. 1 may be implemented via any type of computing device, such as computing device 700, later described with reference to FIG. 7, for example. The components may communicate with each other via network 108, which may include, without limitation, one or more local area networks (LANs) and/or wide area networks (WANs). In exemplary implementations, network 108 comprises the Internet and/or a cellular network, amongst any of a variety of possible public and/or private networks.

It should be understood that any number of user devices, servers, and data sources may be employed within system 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of system 100, while server 106 can be on the server-side of system 100. Server 106 can comprise server-side software designed to work in conjunction with client-side software on user devices 102a and 102b through 102n so as to implement any combination of the features and functionalities discussed in the present disclosure. This division of system 100 is provided to illustrate one example of a suitable system, and there is no requirement for each implementation that any combination of server 106 and user devices 102a and 102b through 102n remain as separate entities.

User devices 102a and 102b through 102n might take on a variety of forms, such as a personal computer (PC), a laptop computer, a mobile phone, a smartphone, a smartwatch, a tablet computer, a wearable computer, a personal digital assistant (PDA), an MP3 player, a global positioning system (GPS) device, a video player, a handheld communications device, a workstation, any combination of these delineated devices, or any other suitable device.

Data sources 104a and 140b through 104n can comprise data sources and/or data systems, which are configured to make data available to any of the various constituents of system 100. In some cases, at least one of the data sources is discrete from user devices 102a and 102b through 102n and server 106. However, at least one of the data sources may be incorporated and/or integrated into at least one of those components.

Figure 2:
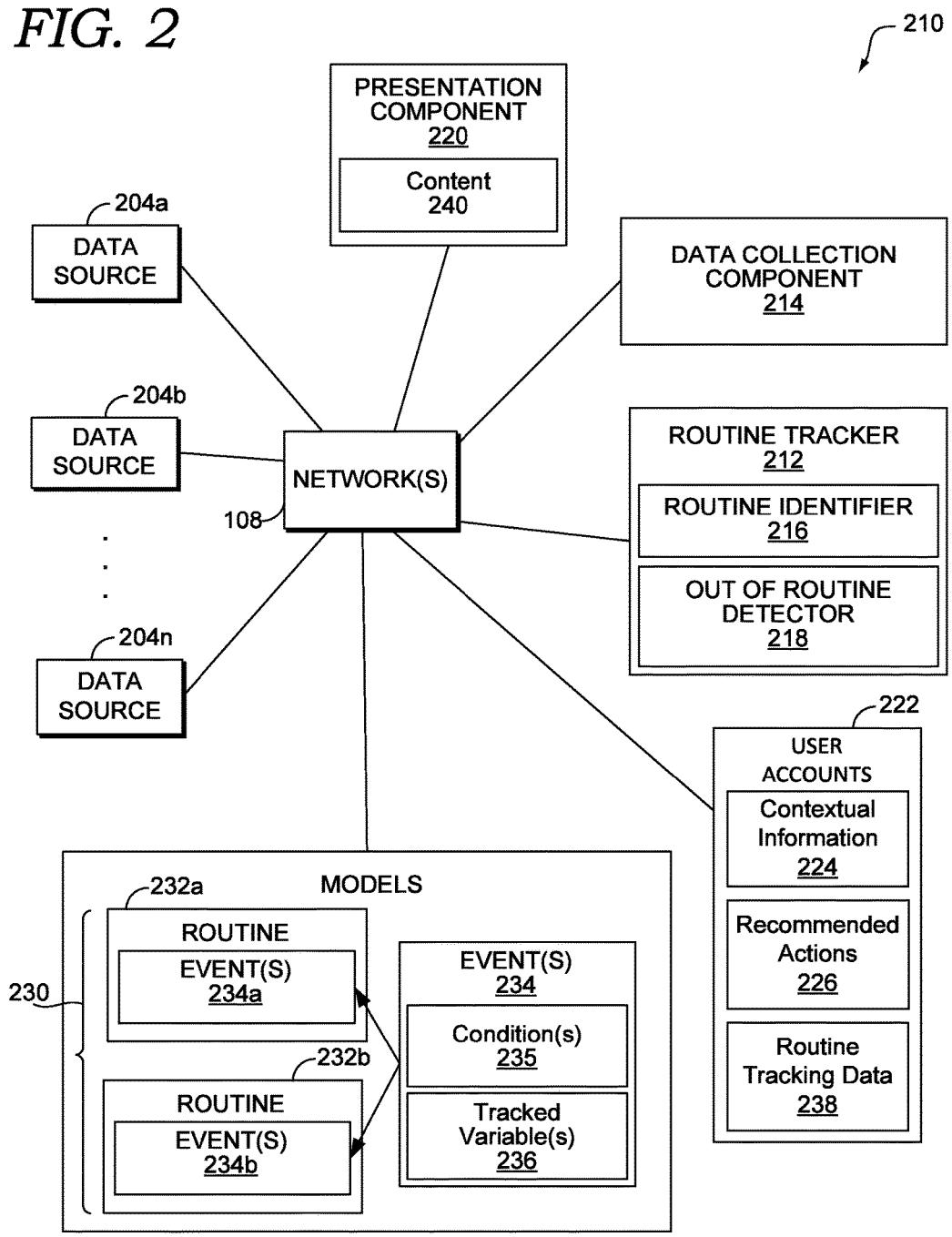
FIG. 2 is a block diagram showing an exemplary routine management environment in accordance with implementations of the present disclosure.

System 100 can be utilized to implement a routine management environment in which routines may be identified, tracked, and analyzed with respect to a plurality of users. Referring now to FIG. 2 with FIG. 1, FIG. 2 illustrates exemplary routine management environment 210 of system 100, in accordance with implementations of the present disclosure.

Routine management environment 210 includes routine tracker 212. Routine tracker 212 comprises routine identifier 216 and out of routine detector 218. Routine identifier 216 is configured to identify routines of one or more users from user data. In some cases, the identification of routines for users is adaptable, such that a routine identified for a user may no longer be identified for the user in the future based on changes in user behavior over time (e.g., changes in behavior patterns). Out of routine detector 218 is configured to detect or identify divergence between users and their routines. In various implementations, out of routine detector 218 may be utilized to detect or identify that users will diverge from, are diverging from, or have diverged from one or more events that make up a routine. In some cases, routines of users may be adapted over time based on changes in user behavior, so as to more accurately detect and identify divergence from those routines (e.g., to adapt to changes in user behavior patterns).

Although routine identifier 216 and out of routine detector 218 are shown as separate components, at least some functionality may be shared between the components. For example, the identification of a routine or event may be implicit in the functionality of out of routine detector 218. As an example, out of routine detector 218 may consider the strength of patterns (indicating routine) formed by detected events in determining whether an out of routine event should be identified. It will therefore be appreciated that not all implementations described herein require both routine identifier 216 and out of routine detector 218.

Routine identifier 216 and out of routine detector 218 may employ accumulated user data and/or interpretive data from one or more data sources, such as any combination of data sources 204a and 204b through 204n, corresponding to data sources 104a and 104b through 104n in FIG. 1. User data corresponds to data associated with one or more users. As used herein, a user can correspond to a user account, such as one of user accounts 222, which optionally may be associated with one or more of a username, a password, a user device (e.g., a media access control address), an Internet Protocol (IP) address, a universally unique identifier (UUID), and/or other user identifiers.

Interpretive data corresponds to data utilized by routine tracker 212 to interpret user data. Interpretive data can be used to provide context to user data, which can support determinations or inferences made by routine tracker 212. As an example, user data could indicate that a user ate a doughnut, whereas interpretative data can comprise nutritional information utilized by routine tracker 212 to infer that the user ate an unhealthy meal. Using user data and/or user data in combination with interpretive data, routine tracker 212 can detect events of users with respect to routines, as will later be described in further detail.

Data collection component 214 can be employed to facilitate the accumulation of user data of one or more users and/or interpretive data for routine tracker 212. The data may be accumulated, and optionally reformatted and/or combined, by data collection component 214 and stored in one or more databases. Any combination of data sources 104a and 104b through 104n can comprise user data of one or more users and/or interpretive data that may be accumulated by data collection component 214.

User data may be associated with one or more user accounts, such as user accounts 222. In some cases, user data may not be directly associated with a user account but may be associated with another user account that is known or designated to correspond to the same user. For example, one of user accounts 222 may be linked to one or more other user accounts, which may be in another system or other systems. As examples, the same user could have a Facebook account, a PayPal account, a Google Account, a Twitter account, a bank account, an eBay account, and an Amazon account, each of which may be associated with user data of the user.

User data and interpretative data can be accumulated from a variety of sources where the data may be available in a variety of formats. Examples of user data include data derived from one or more sensors, such as sensors providing smartphone data, home-sensor data, global positioning system (GPS) data, vehicle signal data, wearable device data, user device data, gyroscope data, accelerometer data, calendar data, email data, schedule data, credit card usage data, purchase history data, other sensor data that may be sensed or otherwise detected by a sensor (or detector) component, derived from a sensor component associated with the user (including location, motion, orientation, position, user-access, user-activity, network-access, device-charging, or other data that is capable of being provided by one or more sensor component) and many more. In some respects, user data may be provided in user signals. A user signal can be a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources.

Routine tracker 212 can be implemented in a variety of potential ways so as to track routines. In some cases, routine tracker 212 comprises an inference engine (e.g., a rule-based inference engine) that is utilized to track routines. The inference engine may utilize interpretive data to associate user data with one or more events of routines, as well as to identify and detect divergence from one or more events of routines. In some cases, routine tracker 212 may employ routine models, corresponding to the routines, examples of which are described below with respect to routine models 230 (also referred to herein as "routines 230"), as well as event models, corresponding to detectable events, examples of which are described below with respect to event models 234 (also referred to herein as "events 234").

Routine tracker 212 may optionally track routines based on routine models 230 that correspond to the routines. Routine models 230 correspond to representations of corresponding routines, examples of which include routine models 232a and 232b (also referred to herein as "routines 232a and 232b"). Each routine model comprises one or more events that make up a corresponding routine. For example, routine model 232a comprises event models 234a (also referred to herein as "events 234a") and routine model 232b comprises event models 234b (also referred to herein as "events 234b").

As described above, an event can correspond to a defined user action or grouping of user actions, which may be under defined conditions, such as a time of day, a day of the week, a location, or other patterns or other detectable behavior associated with a user, such as actions associated with geographic locations, semantics of locations, persons with whom the user is with, weather conditions, and more. Each user action may be identified by routine tracker 212 using one or more user signals associated with the user, as provided by data collection component 214. Examples of events are the user eating at a restaurant, the user eating at a particular restaurant, the user being in a geographic region, the user being at a geographic location, the user attending a meeting, reception of a sensor reading associated with the user, the user going to the gym, and the user being at work, amongst many more possibilities.

Different routines may share one or more events but may be distinguished from each other by at least one event. Thus, one routine could comprise an event of going to the gym (e.g., at a specific time or time frame, such as a day of the week, or within a certain hour of the day) and an event of going to work and another routine could comprise an event of the user attending a meeting and the event of the user going to the gym. In the present example, events 234*a* and 234*b* that make up routines 232*a* and 232*b* are selected from events 234. It is noted that in some cases, an event, such as one of events 234, may not make up a routine but may be utilized to identify one or more out of routine events.

Each event may have a corresponding event definition that comprises one or more conditions and optionally one or more tracked variables. For example, events 234 comprise conditions 235 and tracked variables 236, and routine model 232*b* includes events 234*b*, comprising conditions 235*b* and tracked variables 236*b*. Conditions are utilized by routine tracker 212 to determine whether instances of events have occurred and should be detected. In particular, routine tracker 212 may detect that an instance of an event has occurred based on determining that the conditions corresponding to the event are met.

Any of a variety of conditions may be placed upon detection of an instance of an event. In some respects, one or more conditions of an event may be satisfied by having user data corresponding to the event available to routine tracker 212. As an example, an instance of an event corresponding to a blood pressure reading of a user may be conditioned upon a blood pressure reading being available for a routine of monitoring the blood pressure of the user.

Events may optionally comprise one or more event variables. Event variables comprise data fields that may be populated with data generated from user data by routine tracker 212, as provided by data collection component 214. Events having one or more event variables may also be referred to as variable events. Other events may be static and can be referred to as static events.

In some cases, conditions of events may employ one or more event variables. For example, one or more conditions of an event may place one or more constraints on values provided by user data for one or more event variables of the event. For example, the event may require that the blood pressure reading is within a designated range for an instance of the event to have occurred.

Tracked variables are event variables that are assigned and/or recorded by routine tracker 212 with respect to a corresponding detected instance of an event. In particular, values corresponding to the tracked variables may be stored in association with a user, for example, with respect to a corresponding one of user accounts 222, in routine tracking data 238.

Tracked variables can correspond to any of a variety of user data, examples of which have been described above and include sensor data or readings, which may be sensed by one or more sensors (such as information associated with a user device regarding location, position, motion/orientation, user-access/touch, connecting/disconnecting a charger, user activity on the user device, or other information that may be sensed by one or more sensors, such as sensors found on a mobile device) GPS coordinate samples, and many more. It will be appreciated that values of tracked variables may be associated with one or more events and/or routines and need not be event or routine specific. An example of a tracked variable is a time stamp corresponding to a respective instance of the event. The time stamp can indicate the relative order or sequence of an instance of an event with respect to other instances of the event, and optionally instances of one or more other events of a corresponding routine.

As a further example, an event may comprise a user arriving at a store. One tracked variable may correspond to an arrival location, such as an arrival location name. In detecting the event, routine tracker 212 may infer the arrival as being satisfied based on user data comprising GPS data on the user's phone (e.g., user device 102*a* of FIG. 1), wherein the arrival location name is identified as a store and stored based on interpretive data that includes map data used to associate coordinates from the user's phone with a corresponding location name. Thus, for one instance, the arrival location name may be "Walmart," and for another instance, the arrival location name may be "Target," as examples. However, it will be appreciated that the level of granularity in the detection and tracking of events can vary. Thus, as an example, an arrival location name need not be a tracked variable. Furthermore, other examples of potential tracked variables, or more generally event variables, include arrival time (e.g., a time stamp), arrival location coordinates, driving speed, gas mileage, vehicle name, and many more.

Routine tracker 212 may search and/or analyze user data for any of a variety of events and/or event variables thereof. By matching user data to one or more events and/or event variables thereof, routine tracker 212 may detect events and identify routines from patterns of detected events for users, as well as identify and detect potential or actual divergences from events of the routines with respect to the users.

Some examples of how routine identifier 216 may make such determinations are described herein. However, many variations of routine identification and tracking are possible. In some cases, in determining whether a user practices a routine, routine identifier 216 can determine a confidence score of the routine, and/or respective confidence scores of the one or more events of the routine. Where a confidence score of a routine exceeds a threshold value, routine identifier 216 may determine that the user practices the routine. Similarly, where a confidence score of an event exceeds a threshold value, routine identifier 216 may determine that the user practices the event.

A confidence score may correspond to a relative strength of a corresponding modeled pattern appearing in distributions of one or more values of tracked variables of detected events. The confidence score may be impacted by various factors, such as the variance in the patterns, the age of detected events forming the patterns, and the number of detected events forming the patterns. In some cases, where all confidence scores of all events assigned to a routine exceed their respective threshold values, routine identifier 216 may determine that the user practices the routine. It should be noted that any combination of the aforementioned threshold values may be the same or different with respect to one another.

Confidence scores of events and/or routines can be determined by utilizing one or more confidence metrics. In some implementations, confidence metrics increase confidence scores based on detected repetitions or iterations of events and/or routines over time as indicated in patterns formed by the detected events. Confidence scores may be discounted based on lapsed time with respect to one to all of the repetitions or iterations. For example, a confidence score that may have been high in the past may be low in the present based on corresponding user behavior or behaviors having occurred far in the past. As another example, iterations may be phased out from consideration and/or storage over time. In this way, routine identifier 216 can adapt to changing lifestyles in which users may alter their behaviors over time.

As indicated above, routine tracker 212 can store any of the various data employed in tracking routines of users as routine tracking data 238. In some cases, routine tracking data 238 optionally includes entries that identify routines and assignments between routines and one or more users. The entries may store or otherwise indicate any of the various data associated with a routine, such as events of the routine and/or values associated with tracked variables of those events. Routine tracking data 238 may also comprise confidence scores that correspond to one or more users with respect to events and/or routines. As indicated above, over time, routine tracker 212 may update routine tracking data 238 as user data is periodically analyzed and confidence scores are determined and/or updated.

Out of routine detector 218 may utilize routine tracking data 238 to detect or identify that a user is out of routine based on determining that the user will diverge from, is diverging from, or has diverged from one or more events of a routine of the user. In this respect, out of routine detector 218 may identify one or more out of routine events. In some cases, an event may be out of routine for a routine where it is determined that a user will diverge from, or has diverged from, the event with respect to the routine. In this regard, a divergence can correspond to a departure from a modeled pattern of detected events for the event of the routine. Patterns may be modeled using statistical models, such as parametric models, or other suitable models, and may be analyzed to identify divergences therefrom.

It will be appreciated that in some cases, an event may be identified as out of routine based on an actual divergence from the event where user data indicates that the user has already violated some condition or pattern of the event, as opposed to a predicated divergence from the event where user data indicates that the user is likely to violate some condition or pattern of the event. For example, an example of an out of routine event may be a user performing one or more user actions (e.g., events) at a time when they usually don't perform that action. In some cases, the user may make a phone call at a time when they usually don't make phone calls. In others, the user may send an email late at night when the user typically does not send emails. However, events need not be identifying as out of routine based on temporal divergences. An example is identifying an out of routine event based on a child (i.e., user) communicating with a person they usually do not communicate with online Another example is identifying an out of routine event based on a child (i.e., user) visiting a web site the child typically does not visit. Yet another example is identifying an out of routine event based on unusual patterns (e.g., erratic behavior) in a user's driving behavior (e.g., as indicated by one or more gyroscopes, accelerometers, and/or other sensor data in the vehicle the user is driving and/or the user's cellular phone).

It will further be appreciated that an event may be identified as out of routine based on a prediction of divergence from the event. In this way, identification of out of routine events can be forward looking. A predication of a divergence may be based on interpretive data, detected events, and one or more inferences as to future user actions. As an example, a user may usually go to the park every Tuesday but out of routine detector 218 may predict that the user may not walk in the park next Tuesday based on a weather forecast indicating a high chance for rain on Tuesday. Another example is where the user is identified or detected at the park on a Monday and out of routine detector 218 predicts that the user may not visit the park the following Tuesday because the user's pattern indicates that the user typically visits or walks in the park only once per week.

An example of an actual divergence from an event is a user missing a meeting the user attended every Wednesday. An example of a predicted divergence is a prediction that the user will miss the meeting prior to detecting that the user has actually missed the meeting. For example, out of routine detector 218 may infer that the user will miss the meeting based on determining that the user will be on vacation and out of town during the meeting. The determination may be based on one or more detected events and/or user data, such as calendar scheduling data.

An event may be identified as out of routine based on determining that a user has not, will not, or may not satisfy a predicted instance of the event. For example, out of routine detector 218 may analyze historical detected events for patterns in values of one or more tracked variables, so as to predict value ranges of one or more of the tracked variables to define the predicted instance of the event. Where it is determined that a user has not, will not, or may not satisfy the predicted value ranges, an out of routine event may be detected. As an example, out or routine detector 218 may analyze a distribution of times (e.g., using time stamp values) a user has gone out to lunch in the past and predict that a user will go to lunch between 12:00 PM and 1:00 PM. Based on detected events that indicate the user has not left since arriving at work, after 1:00 PM, out of routine detector 218 may identify the event as out of routine, based on an actual divergence. As another example, based on detected events that indicate the user has scheduled a lunch meeting for the day at 11:30 AM, out of routine detector 218 may identify the event as out of routine, based on a predicted divergence.

As indicated above, patterns of detected events may be employed in identifying that routines correspond to users and/or in detecting divergence from the routines. For example, out of routine detector 218 may detect an out of routine event based upon detecting a divergence from a modeled pattern of one or more tracked variables of the event of the routine.

Exemplary approaches are described below, where each instance of an event has corresponding historical values of tracked variables that form patterns and routine tracker 212 may evaluate the distribution of the tracked variables for patterns. In the following example, a tracked variable for an event is a time stamp corresponding to an instance of the event. However, it will be appreciated that, conceptually, the following can be applied to different types of historical values.

A bag of time stamps (i.e., values of a given tracked variable) can be denoted as $\{t_m\}_{m=1}^{M}$, and mapped to a two-dimensional histogram of hours and days of the week. The two-dimensional histogram can comprise a summation over the instances of the event, such as:

$$h_{ij}=\Sigma_{m=1}^{M}I[\text{dayOfWeek}[t_m]=i]\wedge I[\text{hourOfDay}[t_m]=j].$$

This histogram can be used to determine derivative histograms. For example, a day of the week histogram may correspond to:

$$h_j=\Sigma_i h_{ij}.$$

An hour of the day histogram may correspond to:

$$h_i=\Sigma_j h_{ij}.$$

As further examples, one or more histograms may be determined for particular semantic time resolutions in the form of:

$$h_{iC} = \Sigma_{j \in C} h_{ij}.$$

Any of various semantic time resolutions may be employed, such as weekdays and weekends, or morning, afternoon, and night. An example of the latter is where $C \in \{\text{morning, afternoon, night}\}$, morning=$\{9, 10, 11\}$, afternoon=$\{12, 13, 14, 15, 16\}$, and night=$\{21, 22, 23, 24\}$.

An additional data structure utilized in representing an event can comprise the number of distinct time stamps in every calendar week that has at least one time stamp therein, which may be represented as:

$$w_i^j = \|\{m | t_m \text{ is within the } i\text{-}th\ j \text{ week period}\}\|.$$

As an example, $w_2^3$ can denote the number of distinct time stamps during the $2^{nd}$ three-week period of available time stamps. $N^{(j)}$ may be utilized to denote the number of $j$-week time stamps available in the tracked data, for example, $N^{(3)}$ denotes the number of three-week periods available in the time stamps.

Routine detector 218 may generate a confidence score that quantifies a level of certainty that a particular pattern is formed by the historical values in the tracked variable. In the following example, the above principles are applied utilizing Bayesian statistics.

In some implementations, a confidence score can be generated for a corresponding tracked variable that is indexed by a temporal interval of varying resolution. For time stamps, examples include Tuesday at 9 AM, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\sum_{i}^{K}(\alpha_0 + h_i)}.$$

Where K denotes the number of bins, $\alpha_0$ is a parameter encoding the strength of prior knowledge, and $i^* = \arg\max_i x_i$. Then, the pattern prediction is the bin of the histogram corresponding to $i^*$ and its confidence is given by $x_{i^*}$. As an example, consider a histogram in which morning=3, afternoon=4, and evening=3. Using $\alpha_0=10$, the pattern prediction is afternoon, and the confidence score is $$\frac{10+4}{(10+3)+(10+4)+(10+3)} = \frac{14}{40} \approx 0.35.$$

In accordance with various implementations, more observations results in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of time stamps. Examples include 1 visit per week, and 3 visits every 2 weeks. Using a Gaussian posterior, a confidence score may be generated for a pattern for every period resolution, denoted as j. This may be accomplished by employing the formula:

$$\widehat{\mu^{(j)}} = \lambda \left( \frac{1}{N^{(j)}} \sum_{i}^{N^{(j)}} w_i^{(j)} \right) + (1-\lambda)\mu_0, \text{ where } \lambda = \frac{\sigma_0^2}{\frac{\sigma^2}{N^{(j)}} + \sigma_0^2}.$$

In the foregoing, $\sigma^2$ is the sample variance, and $\sigma_0^2$ and $\mu_0$ are parameters to the formula. A confidence score can be computed by taking a fixed interval around the number of time stamps prediction and computing the cumulative density as:

$$conf_i = P(|x - \widehat{\mu^{(j)}}| < a) = \int_{\widehat{\mu^{(j)}}-a}^{\widehat{\mu^{(j)}}+a} \mathcal{N}(x | \widehat{\mu^{(j)}}, \hat{\sigma}^{(j)}),$$

$$\text{where } \hat{\sigma}^{(j)} = \frac{1}{\frac{N^{(j)}}{\sigma^2} + \frac{1}{\sigma_0^2}}.$$

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$, and $\sigma_0^2=10$. $\mu^{(1)}=4.075$, and $conf_1=0.25$. Furthermore, $\mu^{(2)}=10.31$ and $conf_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., exceeds a threshold value), routine tracker 212 may identify that a routine corresponds to a user and/or whether one or more instances or predicated instances of a routine diverge from the routine using one or more of these values.

As an example, out of routine detector 218 may determine whether a value of the tracked variable of the routine diverges from that pattern. More particularly, out of routine detector 218 may determine that a value of a tracked variable, and thus an instance or predicted instance of a corresponding event, diverges from the pattern formed by the historical values of the tracked variable. In some cases, a divergence may be detected where the value is greater than or equal to approximately one standard deviation from the time stamps of the pattern. In some cases, a divergence may be detected where the value is greater than or equal to approximately two standard deviations from the time stamps of the pattern. The standard deviation may be established by mapping a function to the time stamps of the pattern, such as a Gaussian function, or bell curve, as an example.

As a further example, routine identifier 216 may determine that an event of a routine is being practiced by a user where one or more of the confidence scores for one or more tracked variables exceed a threshold value. In this regard, an event of a routine may be determined as being practiced based on routine identifier 216 identifying one or more patterns in historical values of one or more tracked variables of the event.

In tracking routines with respect to users, routine tracker 212 may employ place prediction, which may be implemented using the histogram model indexed using the temporal interval, as described above. Using the current time, the histogram model may be applied to each of the known places. Each place of these places can yield a probability that estimates a portion of visits to the place at the current time:

$$P(\text{Place} = p \mid \text{time} = t) = \frac{P(\text{time} = t \mid \text{Place} = p)P(\text{Place} = p)}{\sum_{p'} P(\text{time} = t \mid \text{Place} = p')P(\text{Place} = p')}.$$

Quantity P(time=t|Place=p) is the histogram model described above. P(Place=p) is the prior probability of being in place p. The resolution of time t is relaxed in from narrow to broad (e.g., Tuesday At 9 AM=>Weekday Morning) until the above quantity surpasses a threshold, in which case our model predicts place p.

Further, in tracking routines with respect to users, routine tracker 212 may employ next place prediction, which may be implemented using the histogram model indexed by a period and a number of time stamps (i.e., samples), as described above. Using this model, the expectation for a visit in a particular week using the previous number of visits can be computed using the formula:

$$P(\text{time} = t \mid \text{Place} = p, \text{Week} = w) = \begin{cases} P(\text{time} = t \mid \text{Place} = p) & \begin{pmatrix} \#\text{of visits for week } w - \\ \text{Expected Number Of} \\ \text{Visits for week } w \end{pmatrix} > 0 \\ 0 & \text{otherwise} \end{cases}$$

The expected number of visits per week is computed using the period with the highest confidence.

Having identified a divergence in one or more events of a routine of a user, content (e.g., content 240) may be presented to the user based the identified divergence using presentation component 220. The content may be presented, for example, on any combination of user devices 102a and 102b through 102n. In this capacity, presentation component 220 may employ any of the various data shown with respect to user accounts 222 in routine tracking data 238, as well as other data. Presentation component 220 can determine when and/or how content is presented to a user. Presentation component 220 can further determine what content is provided to the user. In some embodiments, presentation component 220 comprises one or more applications or services operating on a computing device (such as device 700 described in FIG. 7 including a user device, such as a mobile computing device) or in the cloud.

Determinations made by presentation component 220 with respect to content to be presented based on an identified divergence from a routine of a user may optionally be based on contextual information corresponding to the divergence between the user and the routine. In some implementations, routine tracker 212 may generate the contextual information, which may be provided to presentation component 220. Contextual information generally corresponds to information that provides context to the divergence.

Routine tracker 212 may generate contextual information utilizing interpretive data to infer or otherwise determine the contextual information, at least partially, from user data associated with the user. For example, contextual information could indicate that a user is out of town if the user is located in a different country than their residence. Other interpretive data could be used to further distinguish whether the user is on a personal vacation or is on a business trip. Routine tracker 212 may also generate contextual information utilizing interpretive data to infer or determine the contextual information, at least partially, from user data associated with at least one other user, such as an aggregate of user data. Contextual information can comprise semantic data corresponding to an identified divergence. Semantic data can supplement user data (e.g., sensor data) that is utilized to identify the divergence, such as semantics of a detected event of a user that indicates the divergence. Examples of semantic data include the time of day, whether it is a weekend, weekday, or holiday, weather conditions, and many more.

Contextual information may indicate or otherwise correspond to a cause of or reason for a divergence from a routine. In some cases, generating the contextual information comprises categorizing a divergence from a routine. In particular, routine tracker 212 may assign one or more predetermined categories to the divergence. An assigned category can correspond to a categorization of a cause of or reason for the divergence. The assignment may optionally be based on an analysis of the user data (e.g., aggregated user data and/or user data corresponding to the user) and/or interpretive data.

In some cases, generating the contextual information comprises assigning one or more user-specific categories, or categories that are specific to a user (i.e., user-specific), to the divergence. Furthermore, generating the contextual information can comprise assigning one or more user-general categories, or categories that are general to the user (i.e., user-general, or non-specific to the user), to the divergence. A cause that is specific to a user may be personal to the user. For example, a user may have missed an event of going to work because the user was sick. A cause that is general to a user may be shared between multiple users. For example, multiple users may have missed an instance of an event due to a national holiday.

In some cases, routine tracker 212 may determine whether a cause is user-specific or user-general by analyzing the divergence with respect to divergences of one or more other users. For example, routine tracker 212 may determine that the cause is not shared between multiple users with respect to the same or different corresponding event(s) and/or routine(s). Where a cause is shared by one or more users, routine tracker 212 may determine that the cause is general to the user. As an example, routine tracker 212 may make the determination based on a number of other user's diverging from the same event(s) and/or routine(s). If many other users are diverging from the same event(s) and/or routine(s), it may be more likely that a cause of a given user's divergence is general to the user. Thus, a cause may be categorized as user-general based at least in part on the number of other users exceeding a threshold value.

In determining whether a cause is user-specific or user-general, or otherwise generating contextual information and/or categorizations for a divergence of a user from a routine, other users may be considered based on one or more identified similarities to the user (i.e., a subset of users). For example, routine tracker 212 may select, or group, users by one or more shared characteristics. One example of a shared characteristic is a shared geographical region. For example, each user may be considered by routine tracker 212 based on being from the same city, state, country, or continent as the user. As another example, a shared characteristic may comprise shared demographic information. Examples include a shared gender, age, age range, income level, race, and/or ethnicity.

Routine tracker 212 may identify one or more shared characteristics from data associated with one or more of user accounts 222, such as profile data of multiple users. In addition, or instead, a shared characteristic may be based on one or more values of one or more tracked variables of one or more events. For example, a tracked variable could be a blood sugar level of a user. Routine tracker 212 may select users based on identified similarities in blood sugar levels. The similarities may be on the aggregate for data accumulated with respect to the users (e.g., an average value over all accumulated values), or could be based on one or more particular instances, or groups of instances, such as one or more instances associated with a divergence.

Other examples of contextual information are confidence scores, variance scores, and other information generated in identifying an out of routine time. A further example is an importance level of the identified out of routine event. For example, the importance level could increase with a number of times an out of routine event is detected for an event. When the importance level is low, no action may be required in response to identifying an out of routine event. Furthermore, different actions may be taken, or may be recommended to be taken, for different importance levels Importance levels could also factor in identified out of routine events for one or more other events and/or routines. For example, the importance level could increase for each identified out of routine event over a period of time.

In some cases, presentation component 220 may provide content to a user based on an identified divergence from a routine and/or contextual information corresponding to the divergence. For example, if contextual information indicates that the user is on vacation in Scotland, the content provided to the user may provide information about the country, leisure activities available in the area, and the like. This content would not be presented, for example, if the contextual information indicated the user was in Canada, or at work. Where contextual information comprises one or more categories, at least some of the content provided to the user may be associated (e.g., pre-associated) with a category assigned to the identified divergence. Thus, different categories may have at least some different associated content for presentation, and the content that is provided to the user may depend upon which category or categories have been assigned to the identified divergence.

In some cases, content may be provided to the user that is not provided to the user when the user is in conformance with each event of a routine. The content may be new content that is generated and/or presented based on the identifying of the divergence. For example, assume that Ben is in the routine of going out for lunch each day around 1 PM. Routine tracker 212 may determine that Ben has diverged from a routine based on detecting that Ben has not left his office as of 3 PM. Based on the detected divergence, content is presented to Ben suggesting that Ben order food, which would not have been presented to Ben but for the divergence being identified. The content may comprise generated content (e.g., generated based on the identifying) comprising one or more specific restaurants, such as fast food restaurants. At least some of the content may be relevant to the out of routine event (e.g., contextual information of the out of routine event) but would not be relevant to the user's tracked pattern of events. For example, a recommended restaurant may not open until 3 PM, and therefore would not be relevant if it were recommended for Ben's typical 1 PM lunch based on patterns of tracked detected events.

In an embodiment the content comprises one or more suggestions, recommendations, or relevant information based on the detected divergence. For example, in one embodiment, upon determining that a user did not arrive at his office by a certain time (e.g., 10:00 AM) in the morning but instead stayed home (e.g., the user is sick), content may be generated including a suggestion that the user send cancellation emails for meetings scheduled that day and/or a prompt asking the user if he would like to automatically reschedule the meetings. Additional content may be generated and provided to the user including a prompt asking if the user would like to schedule an appointment with a doctor, and/or information regarding television programs likely to be of interest to the user.

As another example, using embodiments of the invention it may be determined that a particular user plays golf every Tuesday evening as a routine. Upon determining that a user missed (or is missing, or will miss) her golf game and has thus diverged (or will diverge) from her routine, content may be generated and presented to the user including one or more of (a) a suggestion for scheduling a tee time at a future time, based on the user's schedule, user routine information, information from sources associated with the golf course (such as a website for the golf course), and/or other user information such as calendar information; (b) a prompt asking the user if the user would like make up the missed golf game (missed instance of an event) and/or if the user would like to automatically schedule a game at a future time; (c) additional information that may be relevant to missed golf game or make-up game based on the contextual information, such as green fees on the dates and times of the potential make-up game.

In addition, or instead, presentation component 220 may refrain from presenting content to the user based on an identified divergence from a routine and/or contextual information corresponding to the divergence. For example, content may sometimes be presented based on routine identifier 216 determining a user practices a routine, which may not be presented based on out of routine detector 218 detecting a divergence between the user and the routine. The content may have otherwise been presented absent the identification of the out of routine event but is no longer relevant, and thus not presented, due to the divergence. For example, presentation component 220 may typically present the content to the user based on an indication that the user practices the routine (e.g., from routine identifier 216) without an indication of an identified out of routine event.

To illustrate the foregoing, in the above example, based on identifying the routine of Ben, presentation component 220 may typically present content to Ben comprising a recommended place for Ben to eat, on a periodic basis, such as each day before his lunch at 1 PM (e.g., corresponding to a predicated instance of an event and/or routine). However, based on out of routine detector 218 determining that Ben ate lunch at 12 PM, presentation component 220 may refrain from presenting the content corresponding to the recommendation.

Where presentation component 220 refrains from presenting the content to a user, processing, power, and other resources related to the presentation of the content are conserved. Furthermore, in cases where refraining from presenting the content to the user includes refraining from generating at least some of the content based on an identified divergence from a routine and/or contextual information corresponding to the divergence, resources are further conserved. For example, generating content may utilize network bandwidth, processing power, and energy.

Furthermore, presentation component 220 may modify content presented to the user, or the presentation thereof, based on an identified divergence from a routine and/or contextual information corresponding to the divergence. The content may correspond to content that is typically presented when a user is practicing a routine, and is not detected as diverging from their routine. Examples of modifying content include redacting content, replacing content, changing content, substituting content, and adding to content.

In the example above, the recommendation of the restaurant is an example of such content. An example of a modification of the content would be where the restaurant that is recommended is based on the diverging from the routine. For example, a restaurant may still be recommended to Ben, based on detecting that Ben has diverged from his routine by not having eaten lunch by 2 PM.

However, the restaurant (i.e., content) that is recommended may be based on identification of the divergence, such that it may be different than the restaurant recommended prior to 1 PM. As an example, presentation component 220 may perform restaurant (i.e., content) selection by selecting a restaurant from one or more other selectable restaurants (i.e., selectable content). The selecting may evaluate the restaurants with respect to one or more criteria. The outcome of the evaluation may be different based on the identification of a divergence from a routine. For example, contextual information and/or values of tracked variables associated with the divergence may result in a different restaurant being selected based on the divergence. As an example, the selection of the restaurant may be conditioned upon the restaurant still serving lunch at 2 PM, whereas the restaurant recommended prior to 1 PM no longer serves lunch at 2 PM.

Figure 3:
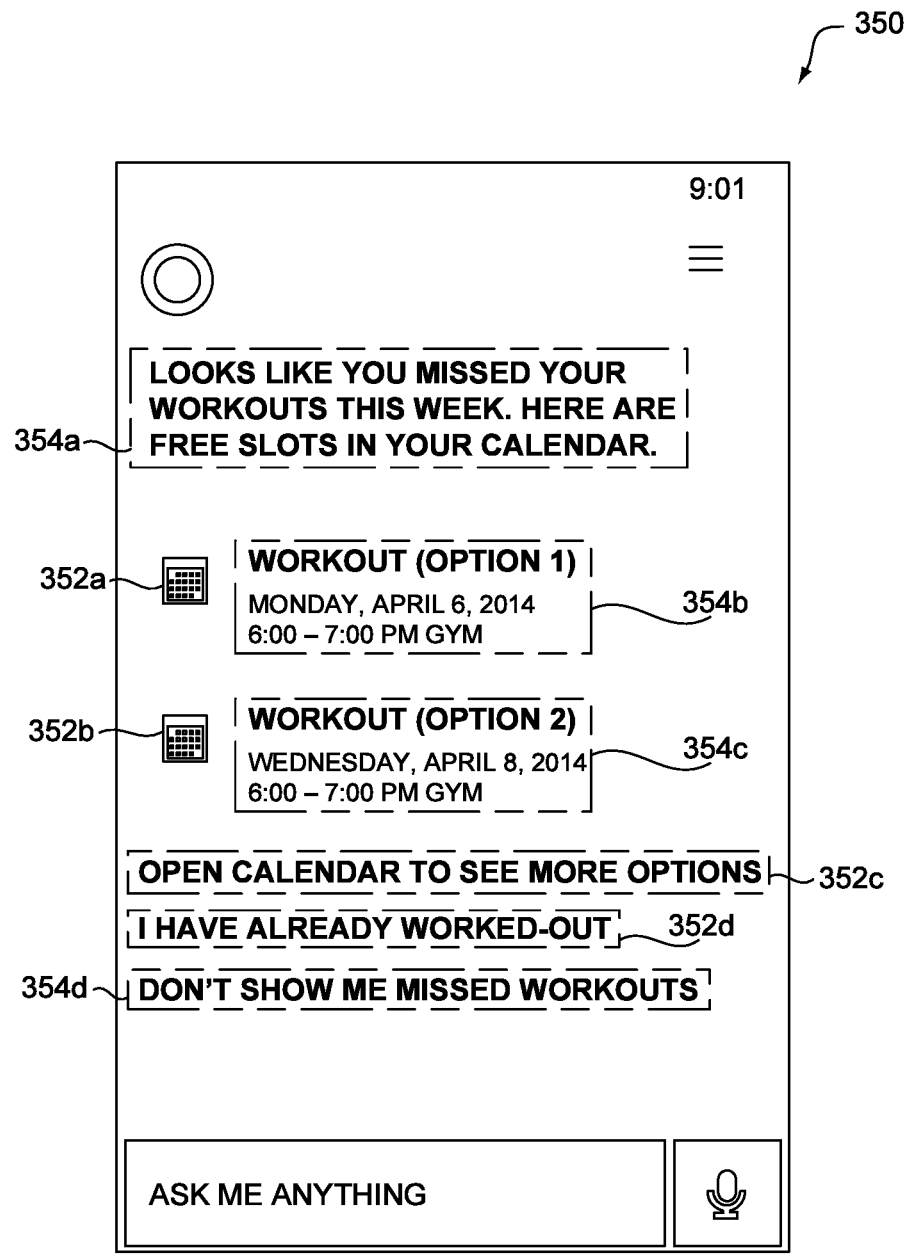
FIG. 3 illustrates an exemplary content in accordance with implementations of the present disclosure.

In some implementations, the content presented to a user is determined using one or more content templates, or content cards. Populated exemplary content card 350 is shown in FIG. 3. A content card can comprise one or more static content fields and/or one or more dynamic content fields. Examples of static content fields include static content fields 352a, 352b, 352c, and 352d in FIG. 3. Examples of dynamic content fields include dynamic content fields 354a, 354b, 354c, and 354d. Static content fields correspond to content fields having corresponding content that is displayed each time the content card is presented. Dynamic content fields correspond to content fields having corresponding content that may vary between presentations of the content card.

In some cases, presentation component 220 may provide content to a user based on an identified divergence from a routine and/or contextual information corresponding to the divergence using one or more content cards, such as content card 350. For example, presentation component 220 may select one or more content cards based on identifying the divergence, and/or modify one or more dynamic content fields of the selected content cards based on identifying the divergence. Thus, for example, corresponding content of one or more dynamic content fields may be modified for presentation, removed from presentation, or otherwise determined based on identifying divergence from a routine. Furthermore, one or more content cards may be modified for presentation, removed from presentation, refrained from or removed from being presented, or otherwise be selected based on identifying divergence from a routine.

Thus, content card 350 may correspond to a presentation of content card 350 based on an identified divergence from a routine and/or contextual information corresponding to the divergence. However, where no divergence is identified, dynamic content field 354a could read "Let's schedule your workout for the week. Here are free slots on your calendar." Dynamic content fields 354b and 354c may comprise one or more different workout slots than shown, and dynamic content field 354d may read "Don't ask to schedule my workouts."

In some implementations, routine tracker 212 selects or generates one or more recommended actions for presentation component 220 in the presenting of the content to the user. A recommended action corresponds to data that presentation component 220 can utilize in determining various aspects of the presenting of content to the user. A recommended action may correspond to one or more courses of action for responding to the identification of an out of routine event. For example, a recommended action may specify whether a presentation component should automatically modify user content or should request information from the user, such as a user confirmation.

A recommended action may specify or designate one or more content, one or more static and/or dynamic content fields (e.g., in a content card), one or more content cards, a time, a place or location, a screen or menu, an environment, a mode or manner of user interaction, or other factors that may be incorporated into conditions or instructions with respect to an action. Presentation component 220 may choose or select to follow one or more conditions and/or instructions associated with or corresponding to a recommended action for presenting content to the user.

As examples, a recommended action may indicate to presentation component 220 (or another application or service), and/or be utilized by presentation component 220 to determine, any combination of when to present content to a user (e.g., using a specified time or time range); how to present content to the user; what content to present to the user; when to modify; generate, or select content to be presented to the user; when to refrain from presenting content to the user; when to seek user feedback with respect to content; and many more.

In some embodiments, recommended actions may correspond to one or more conditions, which may be assessed based on sensor(s) on a user device associated with the user, via user history, patterns or routines (e.g., the user drives to work every day between 8:00 and 8:30 AM), other user information (such as online activity of a user, user communication information including missed communications, urgency or staleness of the content (e.g., the content should be presented to the user in the morning but is no longer relevant after LOAM), the particular user routine that is diverged from, and/or contextual information corresponding to the out of routine event. For example, where the user is likely driving a car between 8:00 and 8:30 AM, content recommended to be presented to the user during this time may be audibly presented to the user while the user is driving. As another example, content regarding a suggestion that the user make up a missed call, such as where the user calls someone (e.g., his mom) every Sunday but did not call that person last Sunday, may be presented when the user accesses his phone app on his mobile device. The content may be presented as a pop-up notification, highlighted message, an icon or symbol in a notifications menu, a text, email, other communication or similar means. (For example, upon selecting the phone app to make a call, a message is displayed notifying the user that he did not call his mom on Sunday and asking the user if he wishes to call his mom now.) Similarly, in another example, upon accessing an email application, the user is prompted to reply to an email that the user has not yet replied to but based on the user's history the user always replies quickly to emails from that contact (e.g., an email from the user's boss). Alternatively, upon picking up the mobile device and without accessing the email application, the user is presented with content that includes a reminder to reply to the email.

Where a recommended action is with respect to one or more content templates, or content cards, the recommended action may specify one or more content cards. For example, a recommended action may be to present one or more content cards to the user, refrain from presenting one or more content cards to a user, or when to present one or more content cards to the user. Furthermore, the recommended action may specify one or more dynamic and/or static content fields with respect to an action associated with content of the fields.

In some cases, routine tracker 212 generates one or more recommended actions based on the generated contextual information. For example, a recommended action may be based on a categorization of a divergence from a routine. Thus, one recommended action may be selected or generated by routine tracker 212 based on the divergence being assigned a user-specific category, and another recommended action may be selected or generated by routine tracker 212 based on the divergence being assigned a user-general category. As another example, at least one recommended action may be generated based on a confidence score utilized in identifying the out of routine event. For example, a recommended action may be selected or generated based on the confidence value exceeding or not exceeding a threshold value.

As described above, in some implementations, presentation component 220 can follow one or more recommended actions provided by routine tracker 212. In some cases, presentation component 220 may determine whether to follow one or more of the recommended actions. As an example, a recommended action could be to request information from the user. Presentation component 220 may request the information from the user based on the recommended action. Presentation component 220, or another application, or service running on a user device, may determine or select, to follow one or more recommended actions and may determine or select to ignore, or not follow, one or more other recommended actions. For example, one or more recommended actions may be ignored, or not followed, based on one or more criteria, such as, the presentation component already having access to information, determining that the user is away from the device or is unlikely to respond to a recommended action, determining that the recommended action no longer applies or is no longer relevant, presentation component 220 having another suitable, or preferred action, and/or other determinations, or inferences, which are based on user data (e.g., user device data) and/or interpretive data.

Furthermore, in some implementations, presentation component 220 may select to modify one or more recommended actions and to follow one or more of the modified recommended actions. In addition, or instead, presentation component 220 may select or generate one or more actions for presenting content to the user based on a divergence without regard to a recommended action. These actions and recommended actions may be determined in similar or different manners from one another, and may consider similar information.

In some cases, instances of presentation component 220 are incorporated into one or more services (e.g., applications, processes, programs, threads, etc.), which may be running on a user device, and/or a different system than any combination of the various constituents of routine management environment 210. As an example, one or more services may receive any combination of information generated and/or stored by routine management environment 210, which may be incorporated into routine tracking data 238.

Examples include one or more confidence scores, contextual information, recommended actions, tracked variable variance scores, and more. A service could be running on a user device and may receive such information from a server. As another example, the service could be running on a server in a different system than servers providing such information. As a further example, the information could be received from one or more other services running on the same device (e.g., a user device) as the service. For example, one to all of the various components of FIG. 2 could be incorporated into the same device, which in some cases may be beneficial for security, privacy, and/or other reasons.

In some cases, one to all of the information may be pushed to the service from a server, for example, based on a subscription to the information. As another option, one to all of the information could be queried for by the service. As an example, the information could be stored in one or more entries in a database corresponding to routine tracking data 238. The service, such as an application, may query that information for use by presentation component 220.

Thus, it will be appreciated that, in some cases, routine tracker 212 and/or other constituents of routine management environment 210 may be provided to applications or services as a cloud service. In this regard, applications on user devices may optionally incorporate an application programming interface (API) for communicating with the cloud service and for providing at least some functionality of presentation component 220. In this way, a common framework may be provided to applications for tailoring content to users based on divergences from their routines.

Figure 4:
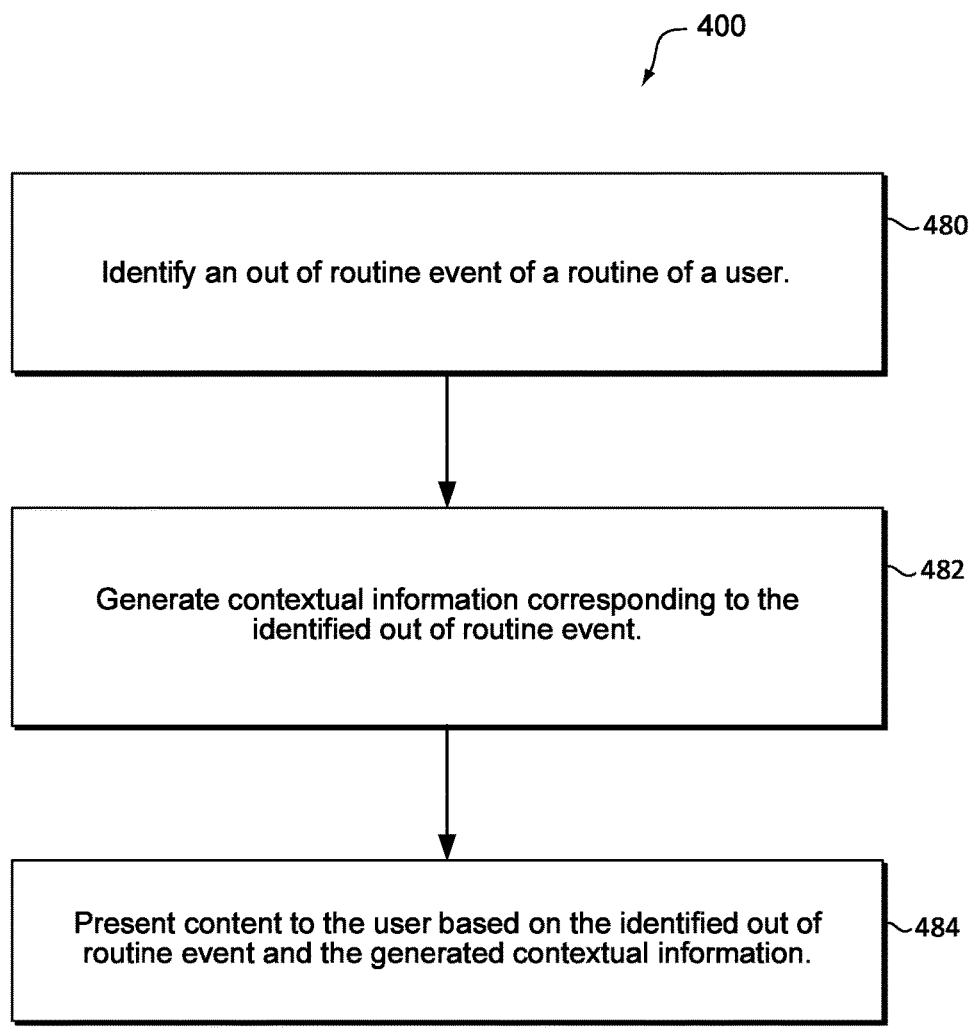
FIG. 4 is a flow diagram showing a method for tailoring content to out of routine events in accordance with implementations of the present disclosure.

Thus, implementations of the present disclosure relate to tailoring service content to out of routine events. Referring now to FIG. 4 with FIGS. 1, 2, and 3, FIG. 4 is a flow diagram showing method 400 for tailoring service content to out of routine events. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 480, method 400 includes identifying an out of routine event of a routine of a user. As an example, let's assume Jane works out every Saturday. In routine management environment 210, routine 232a corresponds to a routine of working out at the gym indexed temporal intervals, which for the present example are days of the week. Assume that routine 232a comprises an event having an event definition comprising a first event variable corresponding to user heart rate, a second event variable corresponding to GPS coordinates, and a third event variable corresponding to a workout time. For the event to be detected, one set of conditions that allows for detection of the event may be that the user heart rate is greater than 120 BPM while the GPS coordinates are within a 100 foot radius of a known gym, as one specific example. It will be appreciated that many other variables and conditions may be incorporated into the event and conditions may offer multiple ways for user actions to qualify as an event. Another example of event conditions could employ accelerometer readings to detect elevated physical activity.

The first variable may be from a user signal from a data source corresponding to a peripheral device (e.g., a heart rate monitor in a fitness band worn by the user) communicating heart rate readings to the user's cellular phone, which are provided to routine tracker 212 by data collection component 214. The second variable may be provided from a user signal from a data source corresponding to the user's cellular phone (e.g., a GPS receiver in a user's cellular phone). The third event variable may be generated from a data source corresponding to a system clock.

In the present example, the workout time is a tracked variable. Each time routine tracker 212 detects an event (i.e., an instance of an event), a time stamp is recorded in association with the event. For example, each time Jane works out, one or more events may be detected. On aggregate, the time stamps of the detected events form one or more patterns, which are identified and analyzed by out of routine detector 218. The time stamps may sufficiently cluster around Thursdays and Saturdays, such that out of routine detector 218 identifies that Jane practices the event of working out on Thursdays and Saturdays. For example, the clustered time stamps for a particular day may have a low enough variance (e.g., as indicated by a variance score), and be of sufficient frequency, that out of routine detector 218 may identify a pattern for that day.

Continuing with the present example, out of routine detector 218 may detect an event Sunday corresponding to Jane receiving a party invitation for the upcoming Saturday. The event may be detected, for example, based on user data from Jane's email service running on her cellular phone. For example, Jane may have received an email from Evite® comprising an invitation to a friend's party, which is identified in Jane's inbox on her cellular phone (or could be identified on the email server). As another example, Jane's friend may have set up an Evite® that designated Jane as an invitee to her party. Jane may be a registered Evite® member and may have given permission for Evite® to share certain information with third party services. The Evite® system may have pushed a notification of the party invitation to data collection component 214, or data collection component 214 may have queried Evite® for invitations.

Out of routine detector 218 may predict that Jane would normally workout the upcoming Saturday based on the patterns formed by her detected events. Out of routine detector 218 may further detect an out of routine event based on predicting that Jane may diverge from one or more predicted workout events on the upcoming Saturday by attending her friend's party.

At block 482, method 400 includes generating contextual information corresponding to the identified out of routine event. As one example, routine tracker 212 may classify Jane's predicted missed workout event as being user-specific. Routine tracker 212 could assign a user-specific category to the out of routine event based on one or more detected events that caused the out of routine event to be detected. For example, the detected event of the wedding invitation may be assigned a user-specific category (e.g., pre-assigned prior to method 400), which may be applied to the out of routine event, or otherwise utilized to generate contextual information for the out of routine event.

As another example, routine tracker 212 may be capable of analyzing similar routines and detecting similar events for a plurality of other users, in addition to Jane. Routine tracker 212 may assess out of routine events identified for the other users and generate contextual information based on detected events and/or out of routine events for the other users. For example, routine tracker 212 may analyze the out of routine events on the aggregate and determine that Jane's out of routine event is user-specific based on having no detected correlation to the aggregated out of routine events. A correlation may have been detected if it was predicted that many users were going to miss their workout on Saturday, in which case the out of routine event may be assigned a user-general category based on the correlation. Using this approach can reduce processing by serving as a heuristic for determining whether the out of routine event is user-specific. Furthermore, in many implementations, routine tracker 212 is actively tracking similar routines (i.e., routine models) for other users, such that information corresponding to detected events and/or out of routine events for the other users is readily available.

Other contextual information can be generated, such as a prediction score generated by out of routine detector 218, corresponding to a predicted likelihood that the out of routine event will occur. Another example of contextual information is an indication that the event is based on a predicted divergence, and not based on an actual divergence from an event. Further contextual information could comprise a confidence score generated by out of routine detector 218 corresponding to the confidence in Jane practicing the event of the routine. Other contextual information could be generated from one or more values of tracked variables. These values can be from a detected event of the out of routine event of the routine. As another example, these values could be from tracked variables of one or more detected events utilized to identity the divergence that caused the out of routine event.

At block 484, method 400 includes presenting content to the user based on the identified out of routine event and the generated contextual information. Continuing with the present example, presentation component 220 may receive an identification of the out of routine event, as well as the generated contextual information. Based on the received identification and generated contextual information, presentation component 220 may select and present a content card corresponding to content card 350 in FIG. 3 (e.g., present on user device 102a in FIG. 1).

Presentation component 220 may generate dynamic content field 354a based on contextual information indicating that the out of routine event is a predicted divergence, as well as contextual information indicating that the out of routine event is predicted to occur on Saturday. Thus, dynamic content field 354a may read "Looks like you may miss your workout this Saturday. Here are some alternative slots on your calendar." It is noted that dynamic content field 354a may instead be generated to read similar to what is shown in FIG. 3, had the contextual information indicated an actual divergence. Dynamic content field 354b and 354c are also populated based on the contextual information. For example, generating those dates may consider that the missed workout is predicted for the upcoming Saturday.

As another example, presentation component 220 may additionally, or instead, refrain from presenting another content card to Jane than the aforementioned content card, based on the identification of the out of routine event and/or the contextual information. For example, presentation component 220 may typically present the other content card to Jane on Sundays to schedule her workout for the upcoming week. Her workout routine may have been previously identified using routine identifier 216. Presentation component 220 may refrain from presenting and possibly generating content for the content card, as the content card may no longer be relevant to Jane for the upcoming week. If Jane had already scheduled a Saturday workout, for example, using the other content card, presentation component 220 could automatically cancel the workout, or could cancel the workout based on input from Jane (e.g., input received based on requesting permission to cancel the workout).

In at least these ways, presentation component 220 can tailor the content that is provided to Jane to the out of routine event. Thus, Jane can receive assistance not only while she is in routine but also while she may diverge from her routine.

Figure 5:
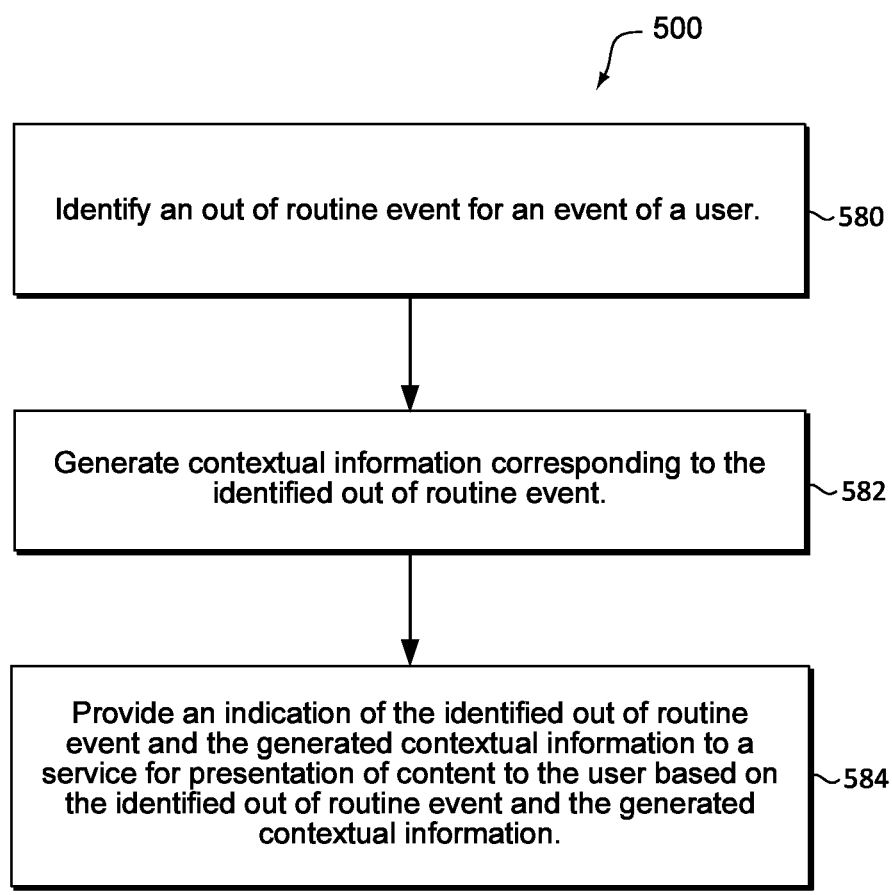
FIG. 5 is a flow diagram showing a method for tailoring content to out of routine events in accordance with implementations of the present disclosure.

Referring now to FIG. 5 with FIGS. 1 and 2, FIG. 5 is a flow diagram showing method 500 for tailoring service content to out of routine events. At block 580, method 500 includes identifying an out of routine event for an event of a user. For example, routine tracker 212 may be running as a cloud service on a cloud, or could be a local service on a user device. Out of routine detector 218 may identify at least one of events 234*b* of routine 232*b* as being out of routine.

At block 582, method 500 includes generating contextual information corresponding to the identified out of routine event. For example, routine tracker 212 may generate at least some of contextual information 224, shown in FIG. 2, for the identified out of routine event. One or more recommended actions may also be generated or determined that correspond to the identified out of routine event. For example, routine tracker 212 may generate at least some of recommended actions 226, shown in FIG. 2, for the identified out of routine event. As examples, routine tracker 212 could select from one or more recommended actions (e.g., recommended actions predefined prior to method 500) for the identified out of routine event. The selection may be based on the generated contextual information. Furthermore, selected recommended actions templates could optionally be modified and/or customized based on the contextual information. It is noted that contextual information 224, recommended actions 226, and routine tracking data 238 are shown as being within user accounts 222, by way of example only. Contextual information 224 and recommended actions 226, for example, may or may not be specific to one or more users, and may or more not be stored in association with a user.

At block 584, method 500 includes providing an indication of the identified out of routine event and the generated contextual information to a service for presentation of content to the user based on the identified out of routine event and the generated contextual information. It is noted that providing the generated contextual information to the service need not be performed in each implementation. Furthermore, one or more recommended actions and/or other out of routine data could optionally be provided to the service.

As one example, a cloud service may provide the aforementioned out of routine data to the service, which may be external to the cloud system comprising the cloud service. The service could be a third-party service and may be running on user device 102*a*. More particularly, the service could be an application, such as a calendar application, a map application, an email application, or another type of application, or app. The application may incorporate an API for communication with the cloud service. This may include requesting the data, and/or requesting one or more portions of the data. As an alternative to requesting, at least some of the data could be pushed to the application, for example, as out of routine events are detected. The application may subscribe to receive these push messages. The API may provide further provide functions for interpreting the received data (e.g., the recommended actions and contextual information), and possibly for at least partially assisting the presentation of the content.

Although block 584 references a single service, the same or different out of routine data can also be provided to other services. Thus, each service can provide content based on out of routine events (e.g., the same out of routine event) without having to separately identify and track user behavior. In some cases, at least some of those services may be on the same user device as the service referenced in block 584. Where the information is provided by a server, in some cases, the information need only be sent to a user device once to be used by multiple services on the user device.

In some cases, the same cloud system and/or cloud service may be utilized to perform method 500 so as to provide out of routine data to multiple services, which may be running on many different user devices. As such, routine management environment 210 can save significant processing, bandwidth, storage, and computing resources by centralizing routine tracking functionality. For example, data collection component 214 can accumulate user data and interpretive data for multiple users, such that each user device does not require separate and redundant data collection and storage. Furthermore, each user device need not store and/or retrieve routine models 230 for routine tracking purposes. Additionally, the processing and storage of routine tracking data can be made more anonymous and secure by being disassociated from the user device, which is closely tied to the user.

Figure 6:
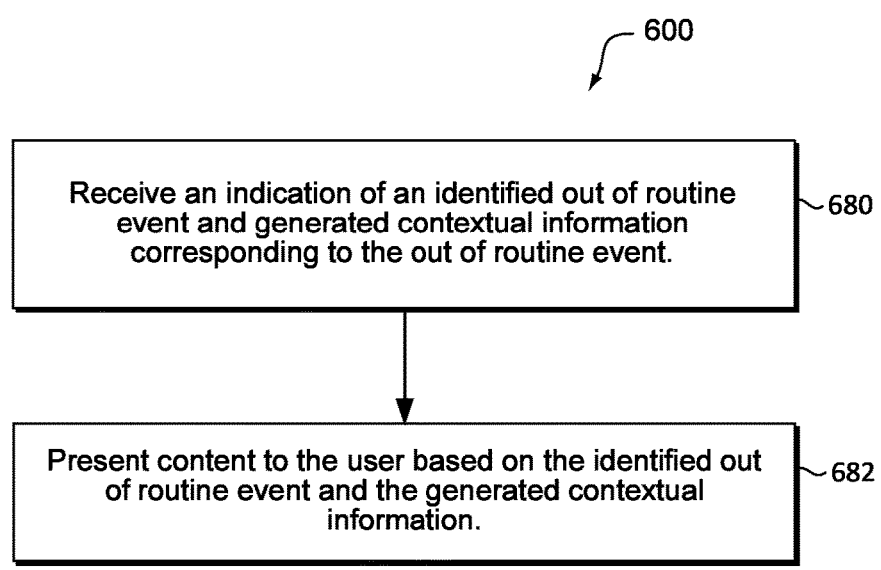
FIG. 6 is a flow diagram showing a method for tailoring content to out of routine events in accordance with implementations of the present disclosure.

Referring now to FIG. 6 with FIGS. 1 and 2, FIG. 6 is a flow diagram showing method 600 for tailoring service content to out of routine events. At block 680, method 600 includes receiving an indication of an identified out of routine event and generated contextual information corresponding to the out of routine event. For example, a service, such as the application described above with respect to method 500, can receive at least the indication of an identified out of routine event, and optionally other out of routine data, such as the generated contextual information and one or more recommended actions.

At block 682, method 600 includes presenting content to the user based on the out of routine event and the generated contextual information. For example, the service can present the content utilizing any of the various out of routine data that is received. Content may be presented to the user utilizing one or more presentation components of user device 102*a*. Where one or more recommended actions are received, the service may follow at least one recommended action, for example, as a default. For example, the service may implement one or more rules associated with a recommended action. The service may optionally determine one or more other actions to perform in addition, or instead of, one or more recommended actions. As an example, the service may decide not to perform a recommended action and may preform one or more other actions based on the decision.

Figure 7:
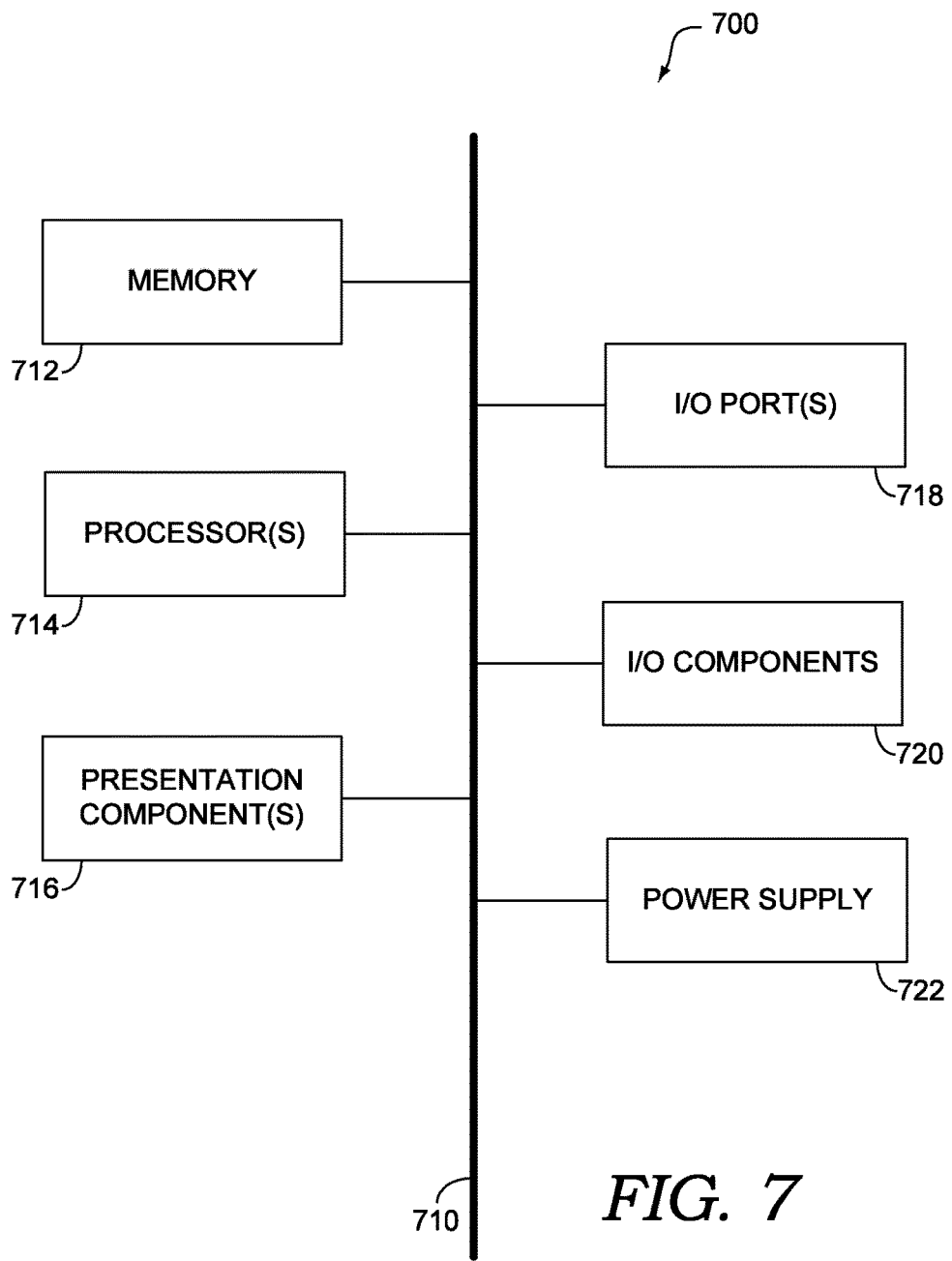
FIG. 7 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, implementations of the present disclosure provide for tailoring content to out of routine events. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computerized system comprising:
   one or more sensors configured to provide from a plurality of client devices sensor data over one or more Internet networks;
   at least one server comprising an out of routine detector configured to detect a deviation from a routine of a user based at least in part on the provided sensor data;
   one or more processors; and
   one or more computer storage media storing computer-useable instructions that, when used by the one or more processors, cause the one or more processors to perform operations comprising:

predicting by the at least one server, using the out of routine detector, a divergence from a pattern of detected instances of an event based at least in part on the sensor data, the event being of the routine of the user, the predicted divergence corresponding to an out of routine event, wherein the predicting of the out of routine event is before the out of routine event occurs;

generating by the at least one server, using the out of routine detector, contextual information corresponding to the predicted out of routine event predicted by the out of routine detector;

determining, by the least one server, to refrain from presenting at least a portion of content to the user and to refrain from generating the at least the portion of content based on the predicted out of routine event;

determining, by the at least one server, a recommended action for a service to perform in providing the content to the user based on the predicted out of routine event, the contextual information, and the determination to refrain from presenting the at least the portion of the content; and transmitting by the at least one server, to the service on a mobile client device over the one or more Internet networks, an indication of the predicted out of routine event and the determined recommendation, the transmitting causing the service to manage presentation of content on the mobile client device based on the recommended action.

2. The computerized system of claim 1, wherein the sensor data comprises location data of a mobile device associated with the user.

3. The computerized system of claim 1, further comprising the at least one server detecting the instances of the event from the sensor data.

4. The computerized system of claim 1, wherein the pattern is formed by time stamps corresponding to the detected instances of the event.

5. The computerized system of claim 1, wherein the service is an application on the mobile client device, and the user device is one of the plurality of client devices.

6. The computerized system of claim 1, wherein the contextual information comprises semantic data corresponding to the predicted out of routine event.

7. The computerized system of claim 1, wherein the service is an application on the mobile client device, and the transmitting causes the application to generate the content by following the recommended action and present the generated content via a user interface on the mobile client device.

8. The computerized system of claim 1, wherein the pattern comprises a modeled pattern derived from a distribution of values of a tracked variable of the event, the values being stored in one or more databases in association with the user.

9. The computerized system of claim 1, wherein the predicting the divergence comprises predicting, using the out of routine detector, the divergence based at least in part on user data associated with the user, the user data comprising one or more of the sensor data, global positioning system (GPS) data, vehicle signal data, wearable device data, gyroscope data, accelerometer data, calendar data, email data, schedule data, credit card usage data, and purchase history data.

10. A computerized method comprising:
receiving by a service on a user device, from a server, one or more network communications comprising:
an indication of a divergence from a pattern of detected instances of an event, the event being of a routine of a user, the divergence corresponding to a predicted out of routine event before the out of event occurs, the divergence being determined based at least in part on sensor data provided by one or more sensors on the user device associated with the user;
contextual information corresponding to the predicted out of routine event; and
a recommended action for the service to perform in providing content to the user based on the predicted out of routine event, wherein the recommended action includes refraining from presenting at least a portion of the content and refraining from generating the at least the portion of the content;
generating, by the service on the user device, a group of content based on the received indication of the predicted out of routine event, the received recommended action, and the received contextual information from the one or more network communications; and
causing presentation of the generated group of content on the user device associated with the user.

11. The computerized method of claim 10, wherein the generating follows the at least one recommended action.

12. The computerized method of claim 10, wherein the recommended action comprises one or more conditions or instructions implemented by the service in determining when to present the generated group of content to the user, how to present the generated group of content to the user, what content is to be included in the generated group of content, when to modify content for generating the group of content, when to generate the group of content, when to refrain from presenting content to the user, and when to solicit user feedback with respect to the generated group of content.

13. The computerized method of claim 10, wherein the deviation corresponds to a missed instance of the event, the generated group of content comprises a suggestion for completing an activity associated with the missed instance of the event, and the recommended action comprises one or more conditions for presenting the suggestion to the user.

14. The computerized method of claim 10, further comprising:
determining, by the service on the user device, not to follow the recommended action in the generating of the group of content.

15. The computerized method of claim 10, wherein the received contextual information comprises a category assigned to the out of routine event, and the presented group of content comprises at least some content associated with the assigned category.

16. The computerized method of claim 10, wherein the contextual information distinguishes to the service whether the predicted out of routine event is specific to the user or non-specific to the user, the service determines the identified out of routine event is non-specific to the user based on the contextual information, and the service generated the group of content based on the determination the predicted out of routine event is non-specific to the user.

17. The computerized method of claim 10, wherein the group of content comprises content that is modified from what would otherwise be presented to the user based on the routine.

18. One or more computer storage media storing computer-useable instructions that, when used by one or more computing devices, cause the one or more computing devices to perform operations comprising:

predicting, by at least one server, a divergence from a pattern of detected instances of an event based at least in part on sensor data from one or more sensors of a plurality of user devices, the event being of a routine of a user, the predicted divergence corresponding to an out of routine event, wherein the predicting of the out of routine event is before the out of routine event occurs and is based on identifying an occurrence of the event that deviates from the pattern of the detected instances of the event, and a strength of the pattern is used in identifying the out of routine even and to refrain from generating the at least the portion of content;

generating, by the at least one server, contextual information corresponding to the predicted out of routine event;

determining, by the at least one server, a recommended action for a service to perform in providing content to the user based on the predicted out of routine event and the contextual information; and transmitting, by the at least one server, to the service on a user device, an indication of the predicted out of routine event and the determined recommendation, the transmitting causing the service to manage presentation of the content on the user device based on the recommended action.

19. The one or more computer storage media of claim 18, further comprising providing, by the at least one server, an indication of the out of routine event to the service, wherein the service presents the content on the user device.

20. The one or more computer storage media of claim 18, wherein the causing the service to manage presentation comprises the service refraining from presenting at least some content on the user device, the at least some content being designated for presentation in response to receiving an indication that the user practices the routine.

* * * * *